Patented Aug. 9, 1938

2,126,242

UNITED STATES PATENT OFFICE 2,126,242

MANUFACTURE OF VARNISH BASE RESIN

Maurice John Bonham, Elkins Park, Pa., assignor to McCloskey Varnish Company, Holmesburg Junction, Philadelphia, Pa., a corporation of Pennsylvania No Drawing. Application June 19, 1935, Serial No. 27,458

4 Claims. (Cl. 260—8)

This invention relates to the manufacture of coating compositions; and it comprises methods wherein tung oil is reacted with glycerine to form a monoglyceryl tungate, the tungate is blended with ester gum and the material reacted with a dibasic organic acid, usually phthalic anhydrid, the reaction mixture being heated until resinous bodies are obtained; and it further comprises the resins so obtained and coating compositions containing them, together with the usual varnish solvents, mineral spirits, coal tar hydrocarbons, etc.; all as more fully hereinafter set forth and as claimed.

The oily components of tung oil, like other vegetable and animals oils, are what are known as triglycerides: each molecule of glycerine is united with 3 mols of fatty acid or is completely esterified. By monoglyceryl tungate I mean a composition in which the ratio of glycerine to the fatty acid is three times as great; each glycerine molecule carries one molecule of the fatty acid of tung oil. It is really a monotungate of glycerine.

Various fatty oils, including tung oil, may be heated with glycerine to produce esters having a greater ratio of glycerine to acid. Materials approaching monoglycerid esters can be produced and these can be resinified with the aid of anhydrid. The preparation of varnish resins from certain monoglyceryl esters and phthalic anhydrid has been proposed. Soluble varnish resins, soluble in varnish solvents, can be prepared in this way employing monoglyceryl linolates. However, when monoglyceryl tungate is used in lieu of the linolate in these methods of the prior art, the reaction products are of little use being insoluble, infusible resinous bodies. Further, such methods as applied to tung oil are, however, difficult to control. One thing that happens during heating of the reaction mixture is "livering"; a phenomenon which may be described as a gelling action; possibly due to polymerization, either local or general. The whole mass may gel or there may be local formation of gelled bodies. The gel is infusible and is quite insoluble. With any livering, that is, production of gelled bodies, the product is not useful and even with the production of a clear, resinous final material, it is apt to be found too infusible and too insoluble in varnish solvents or thinners to be useful in a coating composition.

I have now found that by combining monoglyceryl tungate with an ester gum before reacting with the phthalic anhydrid, this livering is prevented and clear resins soluble in various varnish solvents are obtained. As the ester gum the glycerine esters of rosin or abietic acid are advantageous. It is found in practice that the proportion of ester gum should not be too small; usually not below 120 parts of ester gum to 100 parts of the tungate. With variations in the proportion of ester gum, resins having special solubilities and other properties are obtained. In the present invention this is done: monoglyceryl tungate and an ester gum being heated together and an addition of phthalic anhydrid made.

All of the products are soluble in appropriate varnish solvents and are useful as and in coating compositions for various purposes. At room temperature, they are non-tacky, solid, resinous materials. Hard, brittle or plastic resins may be obtained, the character depending partly upon the extent to which resinification is carried during the various heating operations. Heating is always sufficient to subsequently completely esterify the acids present so that the product has a low acid number. This number is usually less than 12. Further heating increases resinification and may be used to produce resins having special hardness and other properties. The temperature of heating is above 375° F., usually being about 450° F. The time of heating in the operation necessarily depends to some extent on the size of the batch. With a batch of 50 gallons tung oil, heating usually requires 20 minutes to reach 450° F. and requires 2 hours before the acid number is reduced to 12 or less. It is my belief that all the materials enter into reaction and the product is more or less unitary in character; it is not, apparently, a blend.

In practicing the present invention, the monoglyceryl tungate is first formed by adding the calculated amount of glycerine to the tung oil and heating to about 450° F. Heating is continued until a product soluble in an equal proportion of methyl alcohol is obtained. When a test sample gives a clear solution, in the alcohol, formation of the tungate is complete. About 92 parts by weight of glycerine are required to convert 439 parts of China-wood oil into the monoglyceryl tungate, about 1 part glycerine to 4.8 parts China-wood oil.

To 100 parts of the hot tungate are added at least 120 parts of ester gum. The addition of the ester gum checks any tendency to liver and cools the mixture. Then the mixture is held at about 400° F. and stirred until combination is effected and a clear material obtained.

Next, sufficient phthalic anhydrid to esterify the glycerine of the reaction mixture is added with stirring and the temperature raised to about 450° F. and held until esterification is obtained and a test sample cooled to room temperature is a clear homogeneous resin. The heating may be stopped at this stage or it may be continued to obtain harder resins if desired. When a test sample shows the desired consistency, solubility, etc., the heating is stopped and the molten resin is cooled to room temperature. Sometimes the resin is partially cooled and other components of a coating composition or varnish, such as solvents, etc., added before solidification occurs.

In the procedure set forth ante, the details may be varied somewhat to meet the contingencies of particular commercial embodiments thereof. Various specific embodiments illustrative of commercial practice are given post.

In lieu of ester gum made from rosin other ester gums, as for instance those made from Manila copal and other resins of acid character may be used. The ester gum should have a relatively low acid number; an acid number of about 6. Commercially, ester gums are made in somewhat different ways and have somewhat different properties as a result, but in a general way the usual process is to mix rosin and glycerine, with or without a catalyst, and heat in a closed agitator kettle at a temperature around 525° F. The glycerine is allowed to reflux until a desired low acid number is obtained. Vacuum is then applied and the excess of glycerine, if any, is distilled off. These ester gums are often described as tri-esters but as a matter of fact most of the commercial gums appear to be mixtures of esters and contain substantial amounts of the mono- and di-esters, in addition to the tri-ester.

In the present invention, ordinarily, ester gum is first made and added to the glyceryl tungate but in a variation of this procedure giving somewhat different results, an excess of glycerine is used in making the tungate and then rosin, or another acid resin, such as Congo, kauri, Manila, etc., or their acids, is added to the mixture which is then heated until it becomes homogeneous. In practicing this modification, in the initial mixture there may be used about 25 per cent glycerine in excess. On a subsequent addition of the corresponding amount of rosin and heating a good product is obtained. One advantage of this procedure is that a less amount of ester gum is required to prevent livering of the China-wood oil. Control of the operation is easier.

Together with or in lieu of glycerine, I may use other polyvalent alcohols, particularly those containing three or more reactive hydroxyl groups. Polyvalent alcohols containing but two hydroxyl groups may be used in this way, particularly when the ester gum is formed in situ in the tungate.

Phthalic acid can be used instead of the anhydrid. Also other aromatic dibasic acids and anhydrids may be used together with or in place of phthalic anhydrid. Polybasic aliphatic acids can be used alone or in addition to the aromatic acid to obtain special products. For most purposes, glycerine itself and phthalic anhydrid are the best materials.

An important variable in the present invention is the relative amount of ester gum used. By varying the proportion of ester gum the properties of the final product, particularly the hardness and solubility, can be controlled more or less at will. The proportion by weight of ester gum to the tungate can be made quite high. As high as 350 parts of ester gum for 100 parts of tungate can sometimes be used with advantage. With a high proportion of ester gum, however, the final resin begins to approach the character of ester gum, it loses to that extent the distinctive character of the resin of the present invention. There is no real sharp end point as between the two types of resin. However, in all cases the resin even when it may be fairly regarded as modified ester gum, is something of high molecular weight and complex structure and the properties are different from those of the ester gum itself. In operating at the stated temperatures around 450° F., the tungate radical is to some extent polymerized; a fact which may be responsible for some of the unique properties of resins under the present invention. In long continued heating to make hard resins after obtaining the first or preliminary plastic resin, rather high temperatures, up to perhaps 520° F. may be used since the tungate radical has disappeared as such and there is no longer difficulty with livering. In the first part of the operation temperatures around 450° F. are safer.

The following embodiments in which the parts are parts by weight, further illustrate the present invention:

*Example 1.*—Into a suitable vessel usually a closed container, equipped with heating and agitating means, there are introduced 439 parts of China-wood oil and 92 parts of glycerine. The materials are heated to about approximately 450° F. and stirred at that temperature until a test sample dissolved in an equal weight of methyl alcohol yields a clear solution. Usually about 6 to 8 hours heating at said temperature is sufficient.

At room temperature this monoglycerid product is a highly viscous liquid of cloudy appearance, soluble 50 per cent by volume in C. P. methyl alcohol.

*Example 2.*—In making an ester gum particularly suitable for use in the present invention, 100 parts of rosin are heated to approximately 525° F. temperatures until a clear molten mass is obtained. To this is gradually added 10 parts of glycerine, the mass being stirred during this addition. The stirring is continued and the mixture held at 525° F. until the rosin is esterified and an ester gum having an acid number of about 6 is obtained upon cooling.

*Example 3.*—To 100 parts of the monoglyceryl tungate obtained in Example 1 are added 120 parts of the solid ester gum. This checks any livering of the tungate and cools it. This mixture is brought to and held at approximately 400° F. until a clear hot material is obtained. To this hot liquid is added 40 parts of phthalic anhydrid with stirring and the temperature is brought to and maintained at about 450° F. Heating for 15 minutes is often sufficient. When a sample dropped on a glass plate remains clear and has an acid number of 8 to 10 the mass is cooled, enough to permit admixture of the desired solvent, toluol or benzol for example. The resinous material is soluble in coal tar oils, in esters and in ketones. It is not, however, soluble in petroleum hydrocarbons. A varnish made with an equal weight of toluol has a viscosity of 2.00 poises and may be used for the usual varnishing purposes.

In the particular described operation the ratio of ester gum is rather low and it is desirable that heating be interrupted by cooling and introducing the solvent when test shows production of a clear resin. But as stated, heating should be long enough to give a low acid number and complete union or combination of all the reactants.

In the operation of this example, and in all other embodiments of this invention, completeness of reaction is essential in obtaining a varnish base which behaves as a unitary material; is uniformly soluble in varnish solvents. Materials which have not undergone reaction may become segregated in cooling or in solution in the varnish solvent. Both are undesirable. By using the conditions described, there is no formation of insoluble side reaction products which may cause trouble. In all cases, when a test sample cooled to room temperature remains clear and is uniformly soluble in a solvent, the reaction has gone forwardly properly.

In the operation of Example 3 omitting ester gum or reducing the proportions, results in insoluble products when the phthalic anhydrid is placed in reaction.

In commercial practice I have found that it is safer and better to use a proportion of ester gum somewhat above the amount required to just prevent livering.

*Example 4.*—In another procedure, the operation is substantially the same but the proportions used are 100 parts monoglyceryl tungate
    40 parts phthalic anhydrid
    175 parts ester gum About 1 hour is required to give a clear cooled test sample with an acid number of 10 to 12. The molten resin is cooled and reduced with varnish solvents as before.

In this particular operation the mix appears about to liver after 40 minutes at 450° F., but heating may be continued for two hours without livering occurring. This longer heating does not cause any great change in the resin.

The resins obtained are soluble in coal tar hydrocarbons, esters and ketones. They are insoluble in petroleum hydrocarbon used alone, but are soluble in a mixture of petroleum hydrocarbon and coal tar hydrocarbons in the ratio of 85:15 of the former to the latter. In other words, a solution obtained by cutting a partially cooled resin with benzene or toluol tolerates large additions of petroleum oils, such as turpentine substitutes.

In this particular case, and in most other cases, in cutting the partially cooled resin it is desirable to use mixed solvents containing petroleum hydrocarbons, gasoline, turpentine substitutes, naphtha, etc. Sometimes solvent may be added in stages: first benzol or toluol and then a thin petroleum oil.

The resins obtained in Example 4 are soluble in and miscible with blown linseed oil to make valuable coating compositions. The resins may be added to the oil and the mixture heated until solution occurs. The temperatures are advantageously about 350° F. in making a blend. Blown linseed oil may be added to the varnishes obtained by thinning the resins.

Dried films obtained from compositions containing blown linseed oil are clear and dry; showing no cloudiness or precipitation.

The resins made as so far described are, however, not directly soluble in ordinary unoxidized drying oils such as linseed oil, China-wood oil and the various other commercial drying oils. They are not soluble in stand oil; preparations obtained by polymerizing linseed oil at a temperature around 600° F.

*Example 5.*—In another embodiment of this invention, the procedure is the same as in Example 3 except that the proportions are 100 parts monoglycerol tungate
    40 parts phthalic anhydrid
    200 parts ester gum The resins obtained are soluble in petroleum hydrocarbon as well as in the other solvents mentioned. They are, however, somewhat harder and more brittle; they give a harder varnish. Heating in this example may be continued up to 2 hours with a progressive increase in hardness.

*Example 6.*—In another embodiment of the present invention the conditions set forth in Example 3 are somewhat modified. To 439 parts of China-wood oil are added 116 parts of glycerine; an amount 25 per cent in excess of that necessary to produce the monoglycerid. As before the reaction mix is brought to and maintained at about 450° F. until a monoglycerid results. To the hot mix 35 parts of rosin are added per 100 parts of reaction mixture. This cools it somewhat. Heating is continued at 400° F. until all the material has gone into reaction and a clear test sample can be obtained. At this time 40 parts phthalic anhydrid are added and the mixture heated at 450° F. as in Example 3.

In Example 1 ester gum was formed separately and added while in Example 6 reaction between rosin and glycerine occurs in the reaction mixture.

*Example 7.*—Using a reaction mix containing 100 parts monoglyceryl tungate
    40 parts phthalic anhydrid
    290 parts ester gum and made in either way after addition of phthalic acid, the mixture is kept at 450° F. until a test sample gives a clear hard resin with an acid number of 12 or less. The products obtained are soluble in all the solvents hereinbefore mentioned and are also soluble in and miscible with tung oil or China-wood oil. A wide range of varnish bases and coating compositions may be made by heating these resins with China-wood oil. The resins are not, however, easily soluble in linseed oil.

Admixture with tung oil may be made prior to complete cooling of the resin.

*Example 8.*—In making such a blended product to 100 parts of the molten resin of Example 7 are added 156 parts of tung oil (20 gallons) and the mixture held at approximately 525° F. until test sample, on cooling, gives a clear, uniform, plastic varnish base. This may be reduced with 250 parts by weight of turpentine or mineral spirits. The varnish so obtained has a viscosity of 2.00 to 2.50 poises and gives coatings which air-dry tack free in about 3 to 4 hours. The air-dried coating may be baked at 250° F. for further hardening. Driers are added to this varnish and the others described. Addition may be to the molten resin or to the reduced solution.

By varying the proportion of tung oil within a range of say 40 to 400 parts by weight, varnishes of different properties may be obtained; these being shorter or longer in oil. This wide range of miscibility is advantageous. Prior varnish resins mostly have a more restricted range of miscibility.

*Example 9.*—The directions in Example 7 may be varied by slightly increasing the amount of ester gum, using 300 to 100 parts of monoglyceryl tungate in lieu of 290. In so doing, complete miscibility with linseed oil is obtained. The products are soluble in all the other solvents previously mentioned including tung oil.

*Example 10.*—In making a linseed oil blend, to 100 parts of the varnish base obtained according to Example 9, 80 parts of preheated linseed oil are added and the mixture held at 550° F. until a test sample gives a non-tacky, clear, uniform base. About 2 hours heating are required. This varnish base reduced with solvents gives a good short oil varnish. Thinning may be by an equal amount of toluol or mineral spirits.

The relative amount of linseed oil may be increased to produce varnishes longer in oil. As much as 250 parts of oil to 100 parts of resin may be used and varnishes rapidly drying to a tack-free coating obtained. With varnish bases long in oil a longer cooking is advantageous.

A characteristic of the oil soluble resin obtained under the present invention is that their miscibility is better in tung oil than in linseed oil. With most prior varnish bases containing a synthetic resin the reverse is true. Some of the varnish resins of the prior art gave only short oil varnish, whereas others only gave varnish long in oil. Here either type of oil varnish may be obtained at will, without the necessity of using special blends of drying oils or particular mixture of varnish solvents to obtain clear good varnishes.

The varnish bases produced in the present invention are, as stated, unitary in their nature; they do not segregate anything on mixing with solvents, linseed oil, etc.; they give single-phase homogeneous solutions. Preparations made by a simple mixing together of ester gum and any of the resins based on phthalic anhydrid, even where blending is accompanied with a little heating, are not unitary; the two components retaining their individual solubilities. It is practically impossible to make good varnish with a mixture giving any segregation in the manufacture of varnish base or in cutting the base to make a varnish. Ester gum has an excellent range of solubilities, but it is not as hard as can be desired. In the present invention, in one way of looking at it, without forfeiting the good range of solubilities of ester gum, it is given a harder character; it is made better adapted for giving a good varnish of the hardness commercially desired. For another thing, it is found that the compounded materials under the present invention are considerably more resistant to water than are most of the resins based on phthalic anhydrid. The water resistance of varnishes made under the present invention is good; they are well adapted for outside use, on automobiles, houses, etc. The varnish bases are particularly adapted for use in making baking oil varnishes.

What I claim is:—

1. In the manufacture of resinous condensation products useful as varnish bases, from monoglyceryl tungate and phthalic acid by reacting said tungate with said acid, the improvement which comprises blending an ester gum with said tungate prior to reacting with phthalic acid, the said blending being effected by heating the said ester gum and said tungate until a clear solution is obtained and the said ester gum being so blended with said tungate in a ratio of at least 120 parts by weight of ester gum to 100 parts of the tungate, the amount of ester gum being sufficient, upon subsequent reaction of the mixture with phthalic acid to produce a clear homogeneous soluble resin.

2. In the manufacture of varnish bases from monoglyceryl tungate and phthalic acid, said varnish bases being soluble in coal tar hydrocarbons, in petroleum hydrocarbons and in tung oil, the process which comprises adding approximately 290 parts of ester gum to 100 parts of monoglyceryl tungate, heating the mixture to approximately 400° F. until a clear solution is obtained, adding to the hot liquid 40 parts of phthalic anhydrid and further heating the mixture to approximately 450° F. and maintaining the mixture at that temperature until a clear hard resin is obtained upon cooling, said resin having an acid number of less than 12 and being soluble in tung oil, in petroleum hydrocarbons and in coal tar hydrocarbons.

3. As a new varnish base, the clear hard resinous product obtained by the process of claim 2, said hard resin being a homogeneous unitary resin containing said tungate chemically combined with phthalic anhydrid, having an acid number less than 12 and being soluble in petroleum hydrocarbons, coal tar hydrocarbons and tung oil, but being insoluble in linseed oil.

4. The process of making a varnish base resin capable of going into homogeneous solution with linseed oil and tung oil, said base being soluble in coal tar hydrocarbons to give solutions tolerating admixture with petroleum hydrocarbons which comprises heating tung oil with a sufficient amount of glycerine to give a monoglyceryl tungate completely soluble in methyl alcohol, heating the monoglyceryl tungate with at least 120 per cent of ester gum at about 400° F. until a clear solution results, adding to the hot liquid phthalic anhydrid an amount about equal to 40 per cent of the monoglyceryl tungate and heating the mixture at about 450° F. until a clear hard resin is obtained on cooling, said resin having an acid number less than 12.

MAURICE JOHN BONHAM.